US011231095B2

(12) United States Patent
Lin et al.

(10) Patent No.: US 11,231,095 B2
(45) Date of Patent: Jan. 25, 2022

(54) LINEAR TRANSMISSION DEVICE

(71) Applicant: HIWIN TECHNOLOGIES CORP., Taichung (TW)

(72) Inventors: Meng-Ying Lin, Taichung (TW); Shang-Hua Tsai, Taichung (TW); Chi-Lun Cheng, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 184 days.

(21) Appl. No.: 16/739,706

(22) Filed: Jan. 10, 2020

(65) Prior Publication Data

US 2021/0215238 A1 Jul. 15, 2021

(51) Int. Cl.
*F16H 25/22* (2006.01)
*F16C 29/06* (2006.01)

(52) U.S. Cl.
CPC ......... *F16H 25/2204* (2013.01); *F16C 29/06* (2013.01)

(58) Field of Classification Search
CPC ............................. F16H 25/2204; F16C 29/06
See application file for complete search history.

(56) References Cited

U.S. PATENT DOCUMENTS

| | | | | |
|---|---|---|---|---|
| 9,657,820 | B1 * | 5/2017 | Hsieh | F16H 57/0464 |
| 10,767,741 | B1 * | 9/2020 | Liu | F16H 25/2214 |
| 2015/0226311 | A1 * | 8/2015 | Lee | F16H 25/2214 74/424.86 |
| 2019/0204064 | A1 * | 7/2019 | Chen | G01B 21/32 |

FOREIGN PATENT DOCUMENTS

| | | | | | |
|---|---|---|---|---|---|
| DE | 3437246 | A1 | | 4/1986 | |
| DE | 102009040606 | A1 | | 3/2011 | |
| DE | 102018102092 | B4 | | 11/2019 | |
| JP | 2008249146 | A | | 10/2008 | |
| JP | 2019074193 | A | | 5/2019 | |
| KR | 20200001251 | U | * | 6/2020 | F16H 25/24 |
| TW | I648488 | B | | 1/2019 | |
| TW | 201940855 | A | | 10/2019 | |
| WO | 2015137325 | A1 | | 9/2015 | |
| WO | WO-2015137325 | A1 | * | 9/2015 | F16C 29/00 |

OTHER PUBLICATIONS

Bajonettverschluss, Wikipedia.

* cited by examiner

*Primary Examiner* — Terence Boes
(74) *Attorney, Agent, or Firm* — Wang Law Firm, Inc.

(57) ABSTRACT

A linear transmission device suitable for mounting of at least one electronic component includes: an elongated shaft member; a movable member sleeved onto the elongated shaft member and having an end surface; a housing unit disposed on the end surface and includes: a base member, at least one accommodating member and a housing member. The base member is disposed on the elongated shaft member, and includes: an assembling surface and a plurality of assembling portions. The accommodating member is disposed on the base member and includes: a first engaging surface, a second engaging surface, and an accommodating groove for accommodating the electronic component. The first engaging surface has plural connecting portions for combining with the assembling portions. The second engaging surface has plural engaging grooves, the housing member is sleeved on the accommodating member, and includes a plurality of engaging protrusions for engaging with the plurality of engaging grooves.

10 Claims, 11 Drawing Sheets

LINEAR TRANSMISSION DEVICE

BACKGROUND

Field of the Invention

The present invention relates to a linear transmission device, and more particularly to a linear transmission device with a modularized housing unit.

Related Prior Art

Please refer to FIG. 1, which shows a ball screw structure with a detection function disclosed in Taiwan Patent (1648488), including: a screw shaft 10 with an outer thread groove 101; a nut member 11 sleeved on the screw shaft 10 and moveable along an axial direction of the screw shaft 10, and the nut member 11 has an inner thread groove (not shown) cooperating with an outer thread groove 101 of the screw shaft 10 to define a load passage; rolling elements 12 rotatably disposed in the load passage; and a return cover 13 is directly provided on the nut member 11 and provided with a microcontroller 14 and a sensor 15 which can sense the rotation state of the screw shaft 10 in the nut member 11.

However, the above-mentioned microcontroller 14 is likely to be damaged during the disassembly and assembly process, and the disassembly and assembly process is very complicated, so it will cause troubles for maintenance inspection or replacement of parts.

In addition, the return cover 13 of the above-mentioned ball screw structure with detection function is one-piece integrally formed by molding process, resulting in too many restrictions on the final product, for example, it is not possible to adjust the detection items (such as speed, vibration, and temperature detection functions) in a modular manner according to the needs of the ball screw, and it is impossible to replace or increase the number of microcontrollers 14 according to actual needs. Because different customers have different needs and installation environments, a design of a single specification has been difficult to cope with different customers. Therefore, how to solve the above-mentioned conventional problems and deficiencies is the direction in which the present invention intends to study and improve.

The present invention has arisen to mitigate and/or obviate the afore-described disadvantages.

SUMMARY

One objective of the present invention is to provide a linear transmission device, wherein the accommodating members of the housing unit adopt a modular design, which can be disassembled and assembled through simple operations, so that the electronic components can be adjusted according to customer needs to meet more different application needs.

To achieve the above objective, a linear transmission device provided by the present invention is suitable for mounting of at least one electronic component, and comprises:

an elongated shaft member extending along an axial direction;

a movable member sleeved onto the elongated shaft member in a reciprocating displacement along the axial direction, and having an end surface at one end thereof;

a housing unit including: a base member and at least one accommodating member, wherein the base member is disposed on the end surface of the movable member and sleeved onto the elongated shaft member, and includes: an assembling surface and a plurality of assembling portions disposed on the assembling surface, the at least one accommodating member is disposed on the base member and includes: a first engaging surface facing the assembling surface, a second engaging surface opposite to the first engaging surface, and an accommodating groove located between the first engaging surface and the second engaging surface for accommodating the electronic component, and the first engaging surface is provided with a plurality of connecting portions which are combined with the assembling portions.

Preferably, a plurality of engaging grooves are formed in the second engaging surface, the housing unit further includes a housing member sleeved on the at least one accommodating member, and the housing member includes a covering surface for covering the base member and the at least one accommodating member, and a plurality of engaging protrusions formed on the covering surface for engaging with the plurality of engaging grooves.

Preferably, the linear transmission device is a ball screw, and one said accommodating member has a center of curvature which is connected to two ends of the accommodating member to form an angle which is greater than 180 degrees.

Preferably, the linear transmission device is a ball screw, the movable member has a first hole penetrating the end surface, the accommodating member is provided with a second hole penetrating through thereof and corresponding to the first hole, an area of the second hole is larger than that of the first hole, and the first hole communicates with the second hole.

Preferably, the linear transmission device is a ball screw, there are two or more said accommodating members, each of the accommodating members has a first joint end portion and a second joint end opposite to the first joint end portion, and the first joint end portion and the second joint end portion of each of the accommodating members are concave-convexly engaged with or magnetically connected to the first joint end portion and the second joint end portion of an adjacent accommodating member, respectively.

Preferably, the first joint end portion is provided with a plurality of first electrode points, the second joint end portion is provided with a plurality of second electrode points, and the first joint end portion and the second joint end portion of each of the accommodating members are electrically connected to the first joint end portion and the second joint end portion of the adjacent accommodating member, respectively.

Preferably, the linear transmission device is a ball screw, the base member is a wiper and has an inner thread groove corresponding to an outer thread groove of the elongated shaft member.

Preferably, the linear transmission device is a linear guideway, the housing unit is provided with two said accommodating members, one of the accommodating members has a third joint end portion, and another of the accommodating members has a fourth joint end portion capable of being concave-convexly engaged with or magnetically connected to the third engaging end portion.

Preferably, the third joint end portion is provided with a plurality of third electrode points, and the fourth joint end portion is provided with a plurality of fourth electrode points capable of being electrically connected to the plurality of third electrode points, respectively.

Preferably, another said housing unit is disposed at another end surface of the movable member.

The present invention provides a linear transmission device, the main feature of which is that the accommodating members of the housing unit adopts a modular design, which can be changed in shapes, arranged and combined into different styles, so that the electronic components installed in the housing unit can be adjusted according to the customer's needs, which is beneficial to replace or add the electronic components, so that the customer can use the linear transmission device of the present invention more flexibly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

Figure 1:
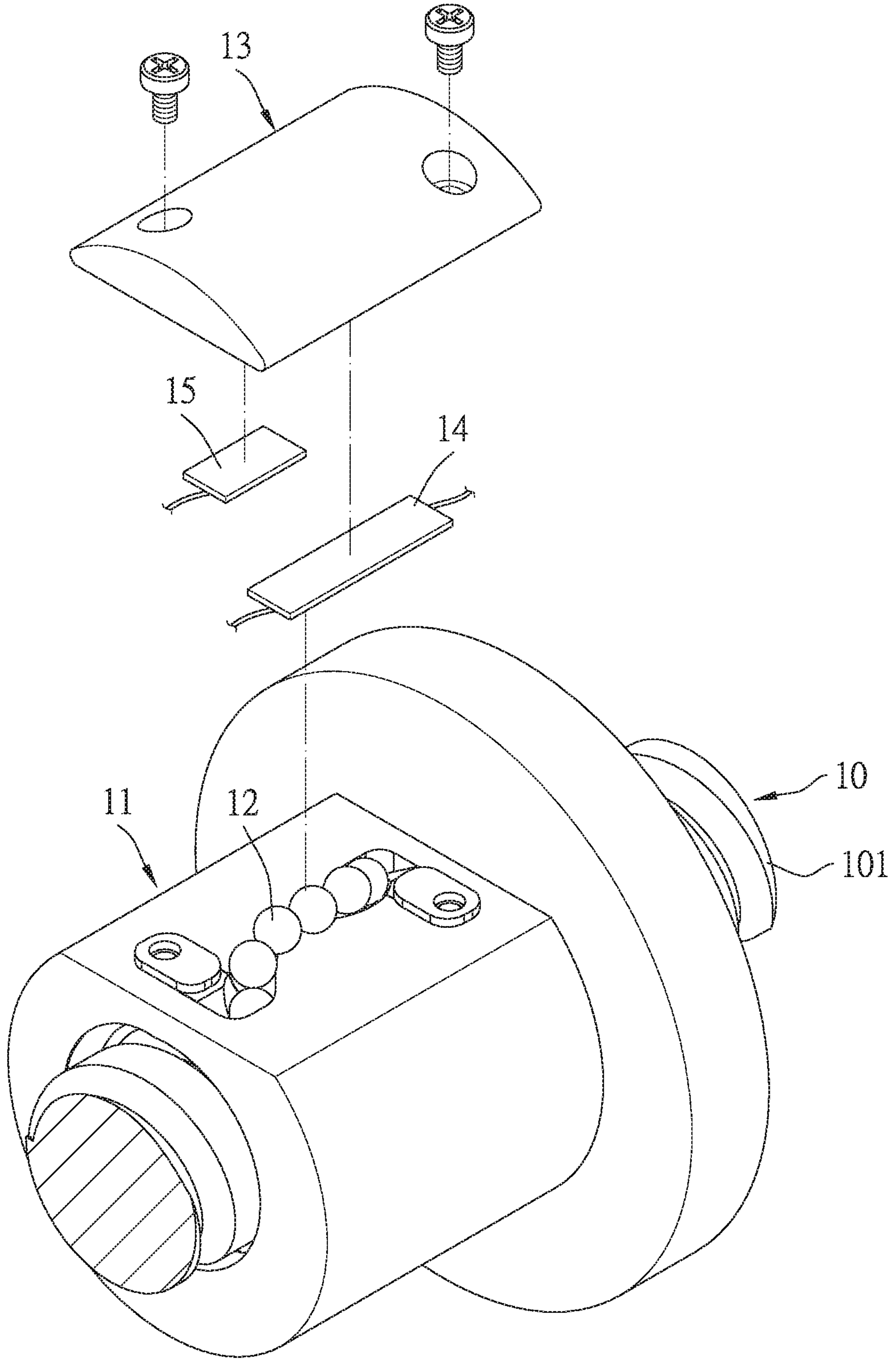
FIG. 1 is one of the drawings of a Taiwan patent (1648488) regarding a ball screw.
Figure 2:
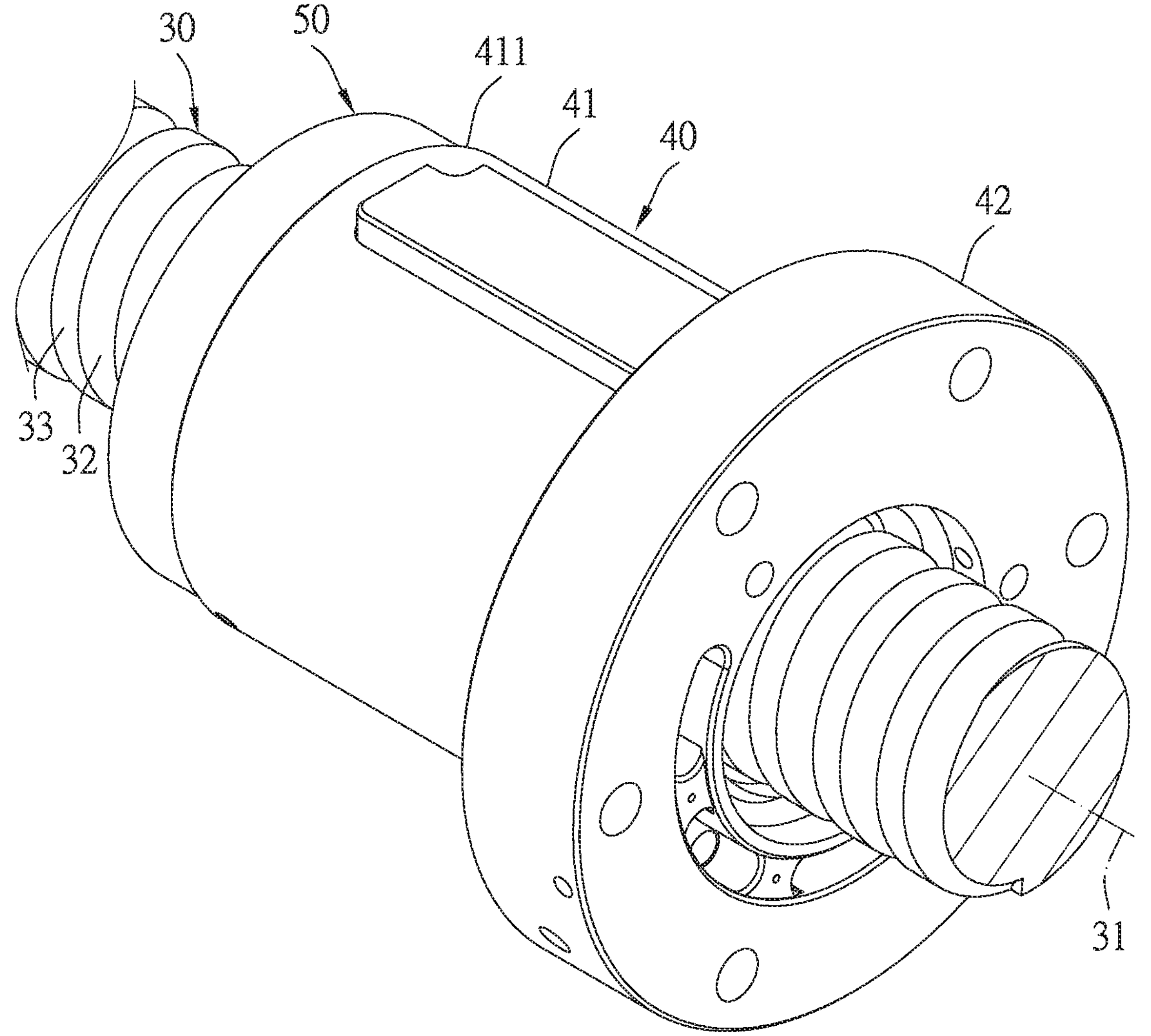
FIG. 2 is a perspective assembly view of a first embodiment of the present invention, showing that the linear transmission device is a ball screw.
Figure 3:
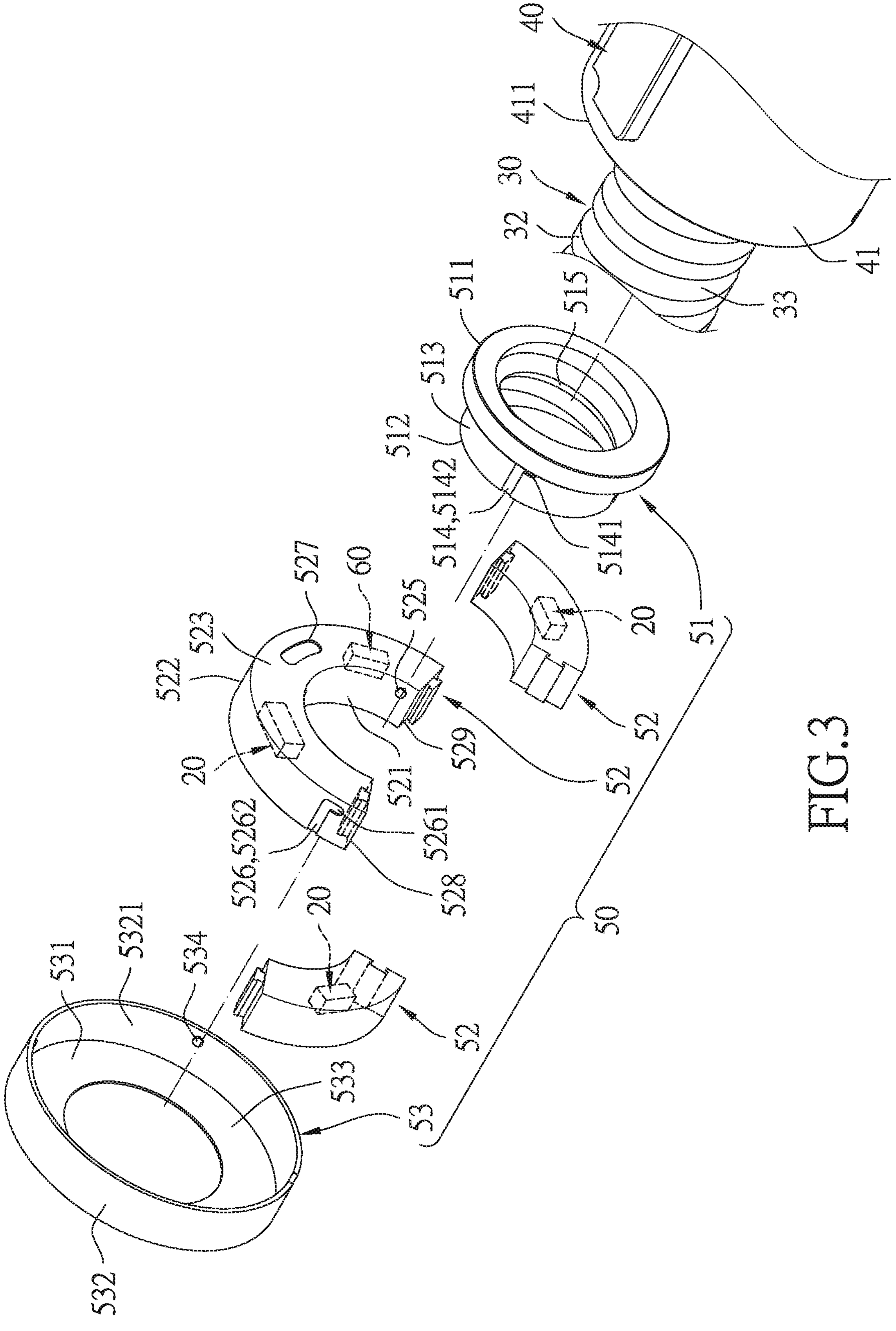
FIG. 3 is an exploded perspective view of the first embodiment of the present invention.

The present invention will be clearer from the following description when viewed together with the accompanying drawings, which show, for purpose of illustrations only, the preferred embodiment in accordance with the present invention.

A preferred embodiment of a linear transmission device of the present invention is shown in FIGS. 2-7. The linear transmission device is a ball screw as an example, but not limited thereto, or can be the linear guideway shown FIG. 10. The linear transmission device is suitable for mounting of a plurality of electronic components 20, and comprises: an elongated shaft member 30, a movable member 40, and a housing unit 50.

The elongated shaft member 30 extends along an axial direction 31. In this embodiment, the elongated shaft member 30 is a screw, and has an annular surface 32 and an outer thread groove 33 recessed in the annular surface 32.

The movable member 40 is sleeved onto the elongated shaft member 30 in a reciprocating displacement along the axial direction 31 and is able to linearly move relative to the elongated shaft member 20. In this embodiment, the movable member 40 is a screw and includes: a pipe body 41, an outer convex ring 42 (commonly known as the flange in the industry) connected to the pipe body 41, and an inner rolling groove (not shown) provided on an inner surface of the pipe body 41 and corresponding to the outer thread groove 33 of the elongated shaft member 30. The outer thread groove 33 and the inner rolling groove form a load path for a rolling unit (not shown) to roll, and the pipe body 41 has an end surface 411 and a first hole 412 penetrating the end surface 411.

Since the assembly method of the elongated shaft member 30 and the movable member 40 are all known, and the operation method is the same as that of the known, which are not the focus of the invention. Therefore, the detailed structure, assembly method and operation method of these components (the elongated shaft member 30 and the movable member 40) will not be described in detail.

The housing unit 50 is disposed on the end surface 411 and includes: a base member 51, a plurality of accommodating members 52, and a housing member 53. The base member 51 is disposed on the end surface 411 of the movable member 40 and sleeved onto the elongated shaft member 30. The base member 51 has a positioning ring portion 511 abutting against the end surface 411 of the movable member 40, and a pipe mounting portion 512 connected to the positioning ring portion 511 and provided for mounting of the plurality of the accommodating members 52. The pipe mounting portion 512 has an annular assembling surface 513 on a radially outer side, and a plurality of assembling portions 514 recessed in the annular assembling surface 513. In this embodiment, the assembling portions 514 are grooves, and the accommodating members 52 are disposed on the annular assembling surface 513 of the pipe mounting portion 512. In this embodiment, each of the accommodating members 52 is an arc-shaped member for matching the annular assembling surface 513 of the pipe mounting portion 512, and includes: a first engaging surface 521 facing the annular assembling surface 513, a second engaging surface 522 opposite to the first engaging surface 521, a bearing wall 523 connected to the first and second engaging surfaces 521, 522, and an accommodating groove 524 located between the first engaging surface 521, the second engaging surface 522 and the bearing wall 523 and for accommodating the electronic component 20. The first engaging surface 521 is provided with a plurality of connecting portions 525 which are combined with the assembling portions 514, and the plurality of connecting portions 525 are convex portions. A plurality of engaging grooves 526 are formed in the second engaging surface 522. The housing member 53 is sleeved on the plurality of the accommodating members 52 along the axial direction 31, and includes: an annular wall 531, and a connecting wall 532 extending axially from an outer edge of the annular wall 531. The annular wall 531 is provided with a covering surface 533 towards a radial inner surface 5321 of the connecting wall 532 and the end surface 411 of the movable member 40. The covering surface 533 covers the base member 51 and the accommodating members 52, and the radial inner surface 5321 is provided with a plurality of engaging protrusions 534 for engaging with the engaging grooves 526 respectively. In this embodiment, the base member 51 is a wiper and has an inner thread groove 515 corresponding to the outer thread groove 33. The base member 51 can not only serve as a bridge between the plurality of accommodating members 52 and the movable member 40, but also can scrape off foreign objects on the elongated shaft member 30 to achieve a dustproof effect, but is not limited thereto, in other embodiments, the base member 51 might simply be an annular structure bridging between the plurality of accommodating members 52 and the movable body 40. In this embodiment, the base member 51 is fixed to the end surface 411 of the pipe body 41 by fasteners (not shown), but is not limited thereto, any measures for fixing the base member 51 to the end surface 411 of the pipe body 41 should be included in the present invention. In addition, in this embodiment, the housing unit 50 is disposed on the end surface 411 of the pipe body 41, but is not limited thereto. In other embodiments, another housing unit 50 may be disposed on an end surface of the outer convex ring 42 of the movable member 40.

Figure 4:
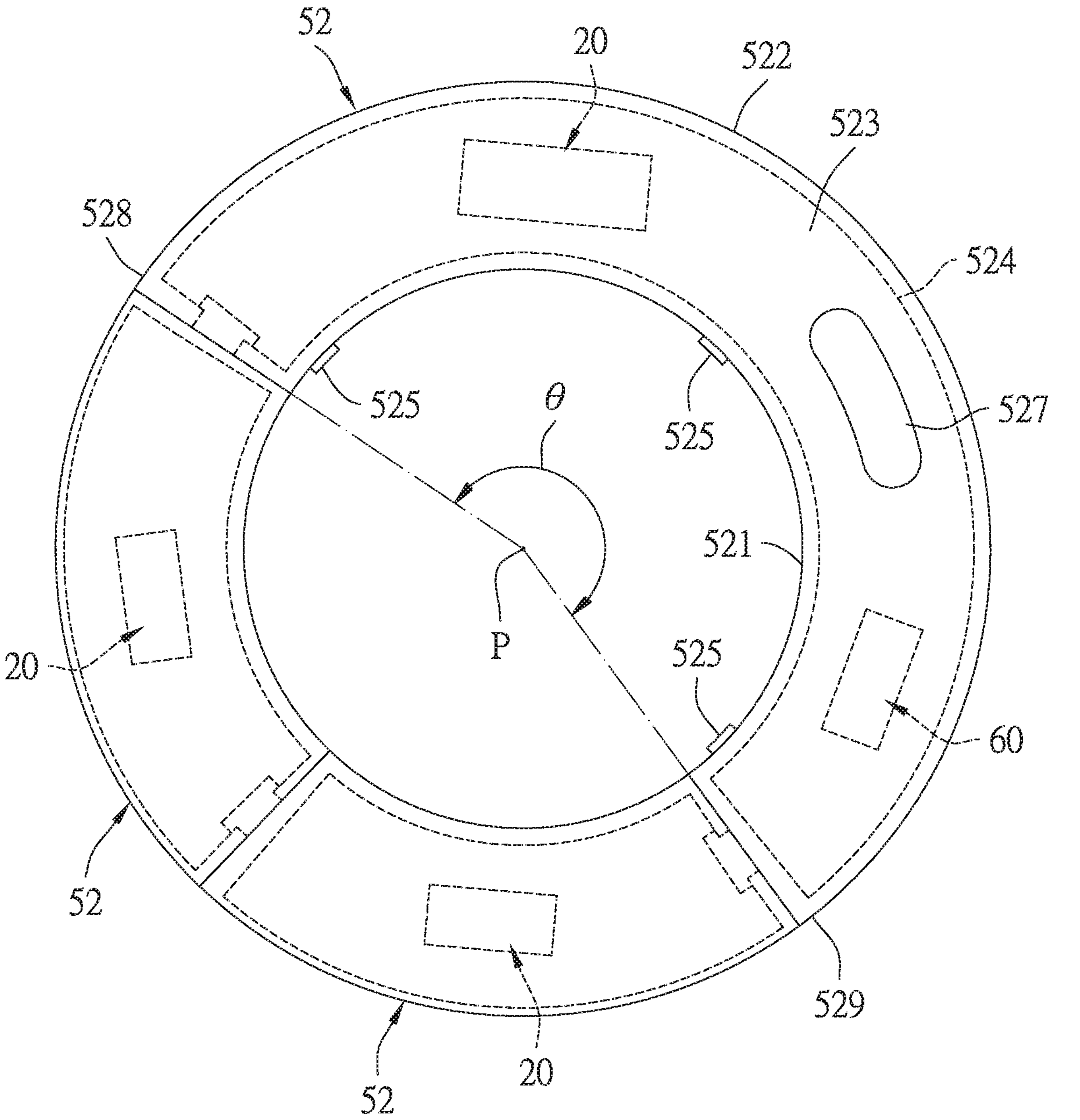
FIG. 4 is a first assembly view of a housing unit according to the first embodiment of the present invention.
Figure 5:
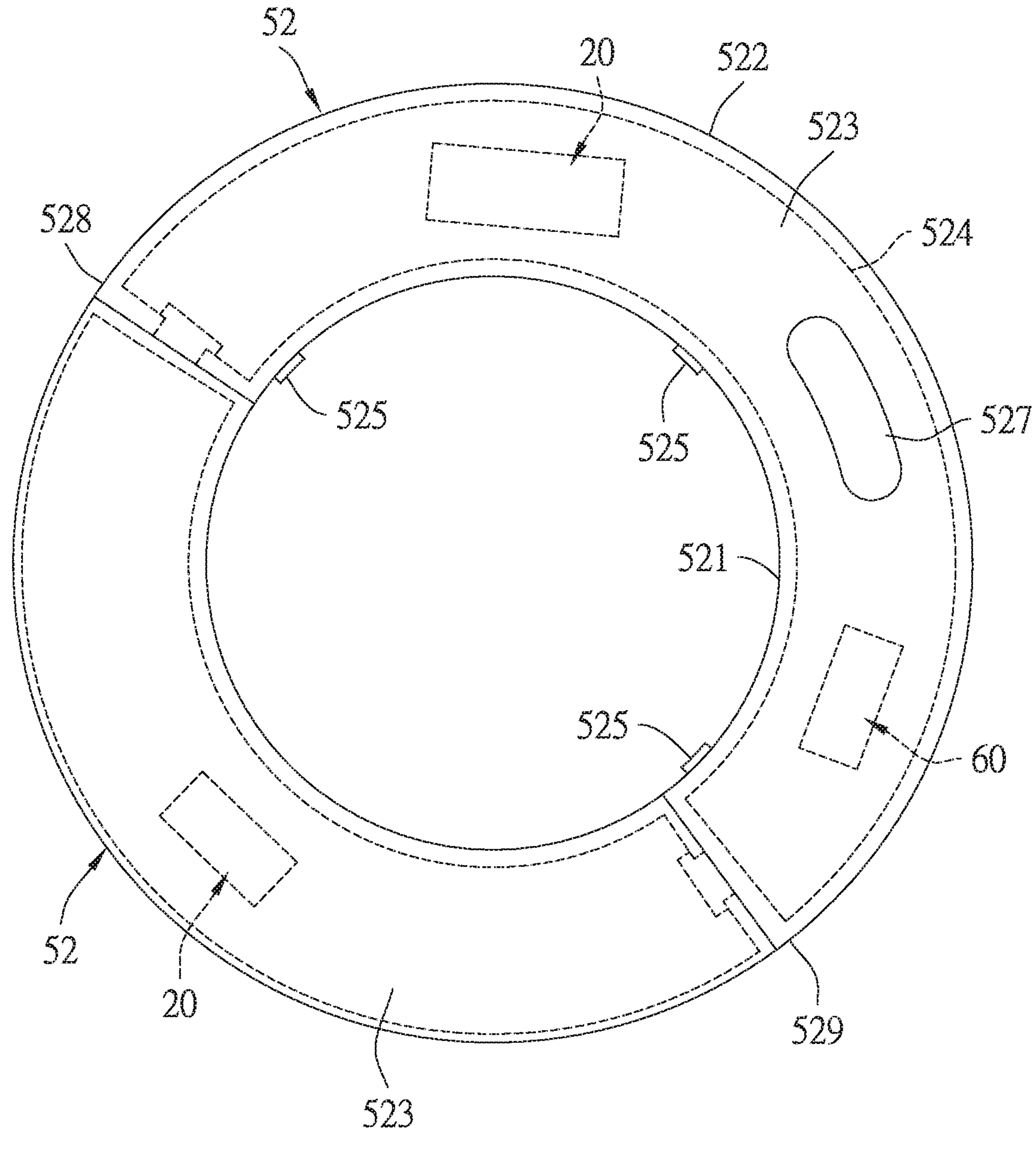
FIG. 5 is a second assembly view of a housing unit according to the first embodiment of the present invention.
Figure 6:
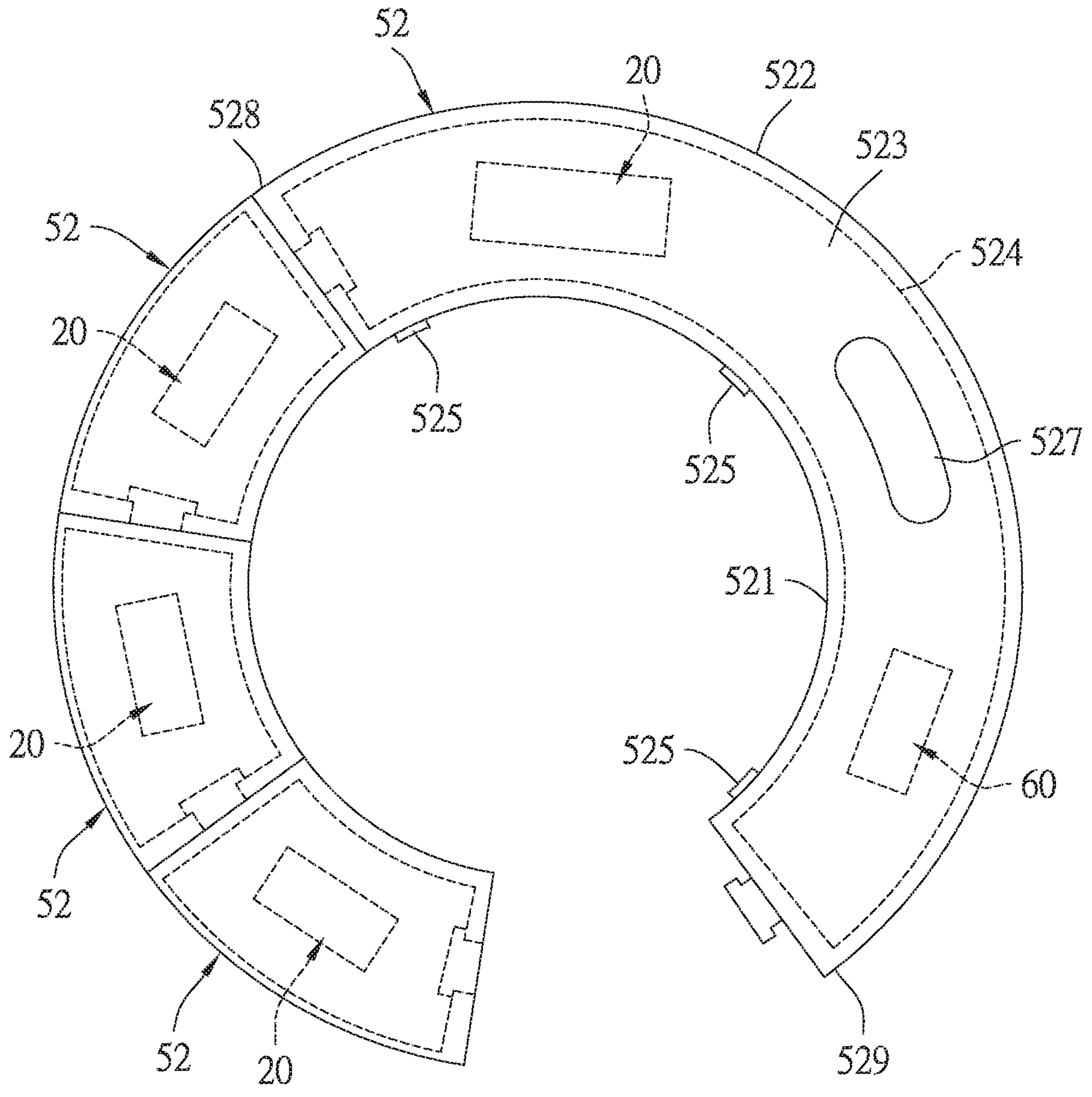
FIG. 6 is a third assembly view of a housing unit according to the first embodiment of the present invention.

Referring to FIG. 4, in this embodiment, there are three accommodating members 52 as an example, but is not limited thereto, and may also be two accommodating members 52 (as shown in FIG. 5), or four accommodating members 52 (as shown in FIG. 6). Therefore, as compared with the conventional technology that adopts a one-piece integral design, the plurality of accommodating members 52 in this invention are of a modular design, so that different electronic components 20 can be respectively disposed in the plurality of accommodating members 52. In this embodiment, the electronic components 20 can be sensors, such as an accelerometer, a strain gauge, a metal sensor, and a force sensor, to measure various data of the movable member 40, but are not limited thereto. In other embodiments, the electronic components 20 may be other types of active/passive components, such as a processing unit which may be connected to sensors disposed in the movable member 40 to calculate the data measured by the sensors, and transmit the calculated electronic signal to the outside. In summary, it can be disassembled and assembled through simple operations, so that the plurality of accommodating members 52 can be adjusted in various ways according to the needs of customers, so as to meet more different application requirements.

Referring again to FIGS. 4 to 6, in this embodiment, each of the accommodating members 52 has a first joint end portion 528 and a second joint end 529 opposite to the first joint end portion 528. The first joint end portion 528 and the second joint end portion 529 of each of the accommodating members 52 can be concave-convexly engaged with the first joint end portion 528 and the second joint end portion 529 of the adjacent accommodating member 52, respectively, so as to achieve the effect of combining stability and reliable positioning, but it is not limited thereto. Please refer to FIG. 9, in other embodiments, the first joint end portion 528 and the second joint end portion 529 of each of the accommodating members 52 can be magnetically connected to the first joint end portion 528 and the second joint end portion 529 of the adjacent accommodating member 52, respectively, so as to achieve the effect of easy assembling and disassembling. The first joint end portion 528 of each of the accommodating members 52 includes: a first magnetic end surface 5281, and a first fixing groove 5282 that connects the first magnetic end surface 5281 and the groove bottom surface 5241 of a corresponding one of the accommodating grooves 524 and is provided for mounting of a first magnetic piece 80. The second joint end portion 529 of each of the accommodating members 52 includes: a second magnetic end surface 5291, and a second fixing groove 5292 that connects the second magnetic end surface 5291 and the groove bottom surface 5241 of a corresponding one of the accommodating grooves 524 and is provided for mounting of a second magnetic member 90. The first and second magnetic members 80, 90 are magnets.

As shown in FIG. 4, the number of the accommodating members 52 is three. One of the accommodating members 52 has a center of curvature P which is connected to two ends of the accommodating member 52 to form an angle θ which is greater than 180 degrees, so as to improve the strength of the overall structure. In this embodiment, the accommodating member 52 and the other two accommodating members 52 form a 360-degree closed annular structure, but this embodiment is not served as a limitation, in other embodiments, the plurality of accommodating members 52 are not necessarily required to form a 360-degree closed annular structure, and may also have an opening (as shown in FIG. 6).

Referring again to FIG. 4, the present invention further includes a transmission unit 60 installed the accommodating grooves 524 of one of the accommodating members 52 and electrically connected to the electronic component 20; thereby, the purpose of signal transmission is achieved, wherein the signal transmission is transmitted by wireless transmission, but it is not limited, or can also be transmitted by wired transmission. In this embodiment, LoRa is used to achieve signal transmission. Therefore, it has the advantages of long-distance transmission, low power consumption and low cost. However, it is not limited to this. Wi-Fi, Li-Fi, Bluetooth, ZigBee, 4G, 5G and other wireless communication technologies can also be used for communication transmission.

Each of the assembling portions 514 has a first neck portion 5141 for each of the connecting portions 525 to abut, and a first body portion 5142 connected and perpendicular to the first neck portion 5141. When assembling the base member 51 and the plurality of accommodating members 52, the connecting portion 525 of each of the accommodating members 52 is first passed through the first body portion 5142 of the assembling portion 514, and then the accommodating member 52 is rotated (clockwise in this embodiment), so that the connecting portion 525 of the accommodating member 52 can be positioned at the periphery of the first neck portion 5141. Each of the engaging grooves 526 has a second neck portion 5261 for each of the engaging protrusions 534 to abut, and a second body portion 5262 connected to and perpendicular to the second neck portion 5261. When assembling the plurality of accommodating members 52 and the housing member 53, the engaging protrusion 534 of the housing member 53 is first passed through the second body portion 5262 of the engaging groove 526, and then the housing member 53 is rotated (in the same direction as the accommodating member 52), so that the engaging protrusion 534 of the housing member 53 can be positioned at the periphery of the second neck portion 5261 so as to achieve the effect of stable assembling.

Figure 7:
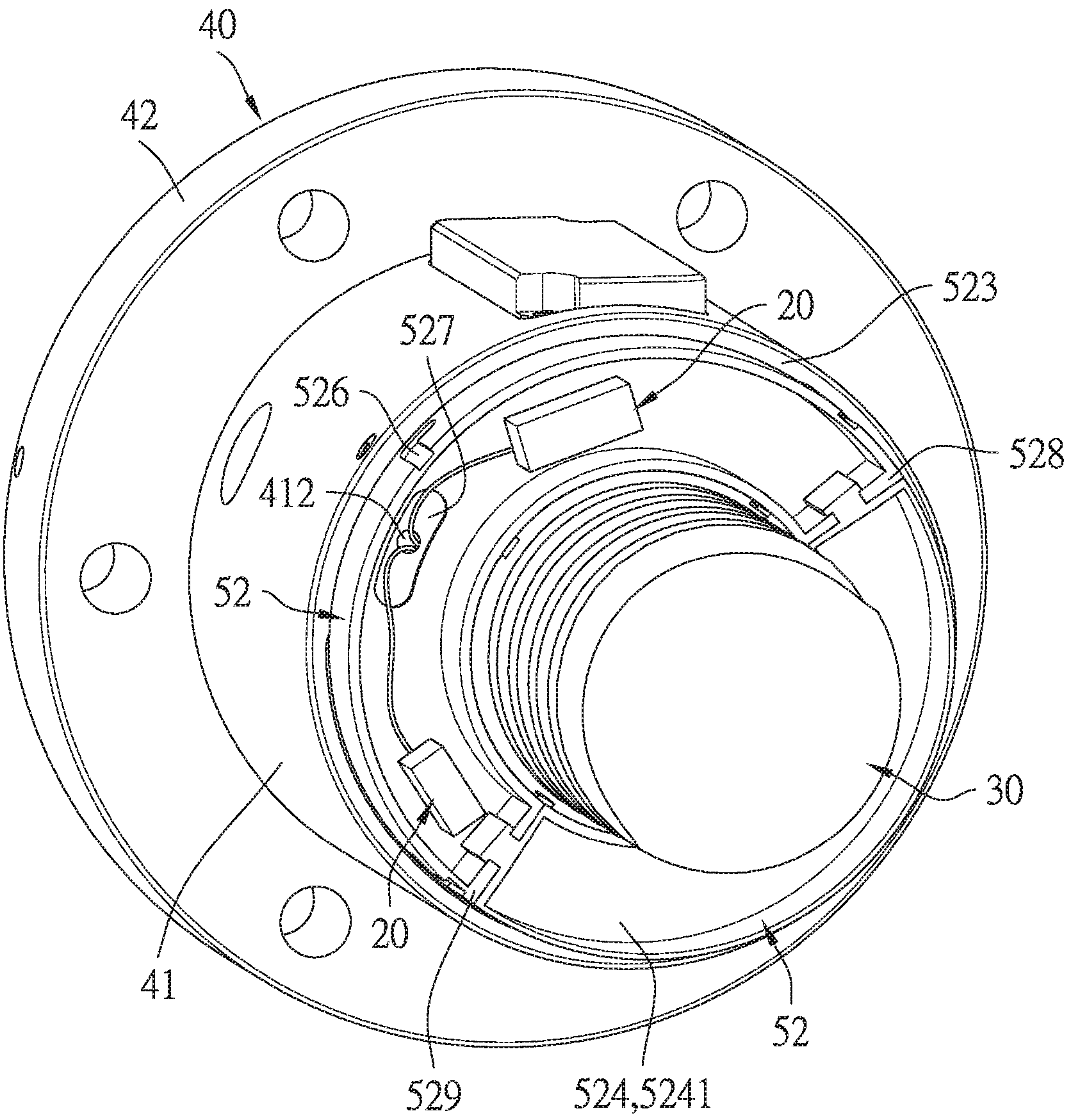
FIG. 7 is another perspective view of the first embodiment of the present invention.

Referring to FIG. 7, the accommodating member 52 is provided with a second hole 527 penetrating through thereof and corresponding to the first hole 412. The area of the second hole 527 is larger than the first hole 412, and the first hole 412 communicates with the second hole 527, so that a wire can be passed through the first hole 412 and the second hole 527 from the inside of the movable member 40, thereby achieving the purpose of connecting the electronic components 20.

Figure 8:
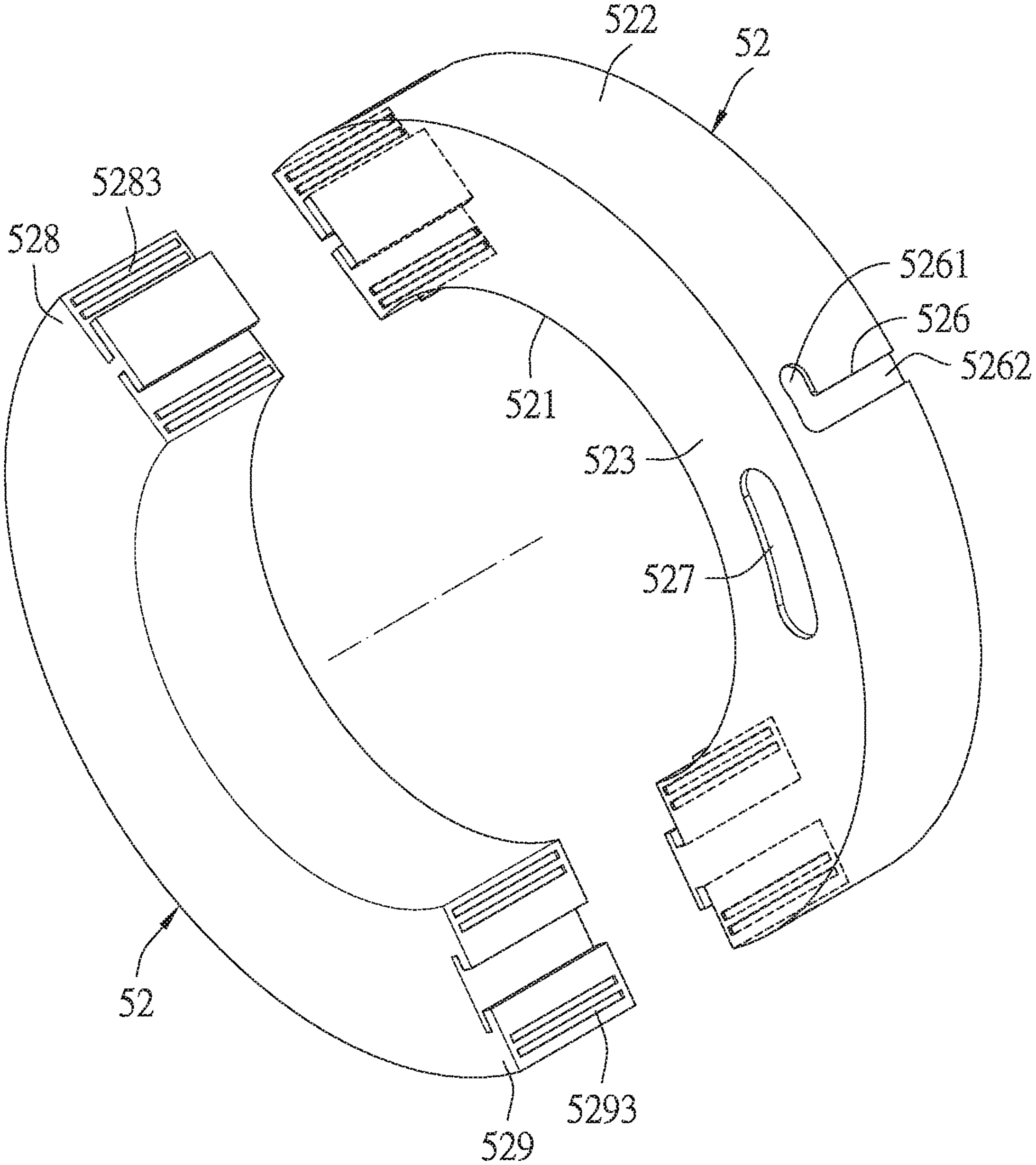
FIG. 8 is a schematic perspective view of an accommodating member according to the second embodiment of the present invention.
Figure 9:
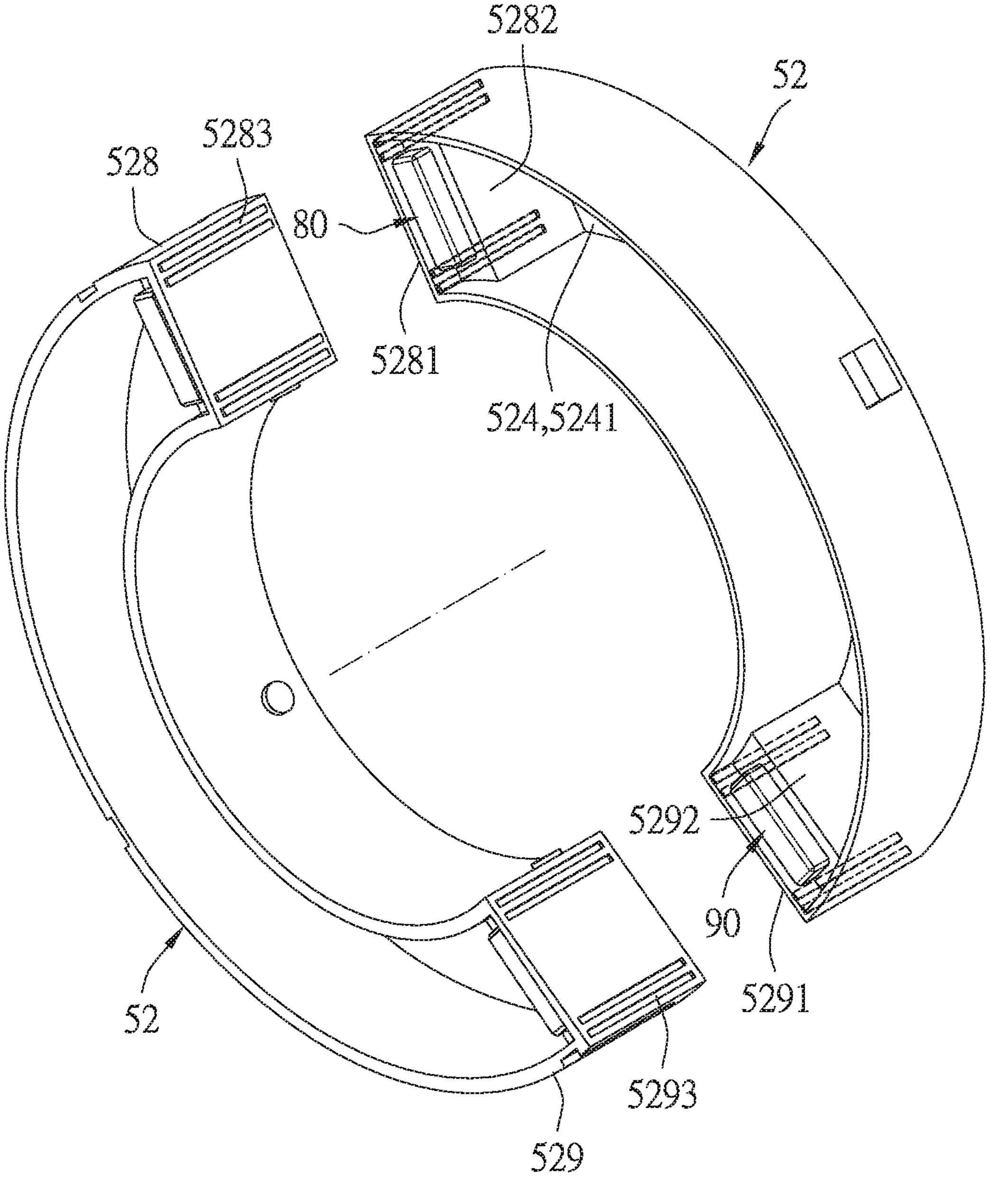
FIG. 9 is a perspective view of the third embodiment of the present invention, showing magnetic connection of two adjacent accommodating members.

Please refer to FIGS. 8 and 9, the first joint end portion 528 is provided with a plurality of first electrode points 5283, and the second joint end portion 529 is provided with a plurality of second electrode points 5293. The plurality of first electrode points 5283 are four, which are respectively GND, VCC, SDA, and SCL, and the plurality of second electrode points 5293 are also four, which are GND, VCC, SDA, and SCL, respectively. Thereby, the first joint end portion 528 and the second joint end portion 529 of each of the accommodating members 52 can be electrically connected to the first joint end portion 528 and the second joint end portion 529 of an adjacent accommodating member 52, respectively, thus reducing the wiring, and when one of the accommodating members 52 is disassembled, it can also achieve the advantage of not affecting the normal operation of the other electronic components 20.

Figure 10:
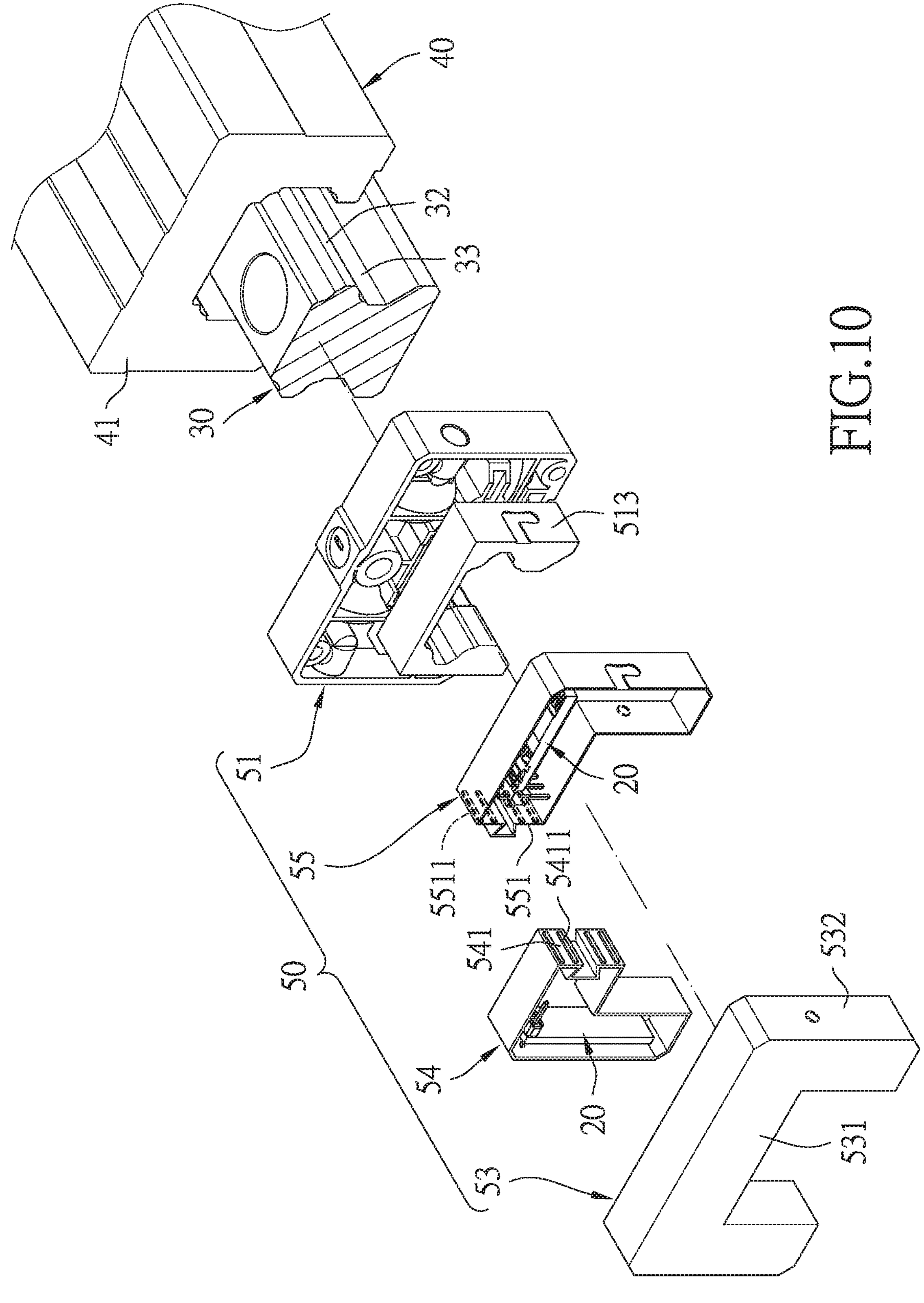
FIG. 10 is an exploded perspective view of a fourth embodiment of the present invention, showing that the linear transmission device is a linear guideway, and the first accommodating member and the second accommodating member are concave-convexly engaged.
Figure 11:
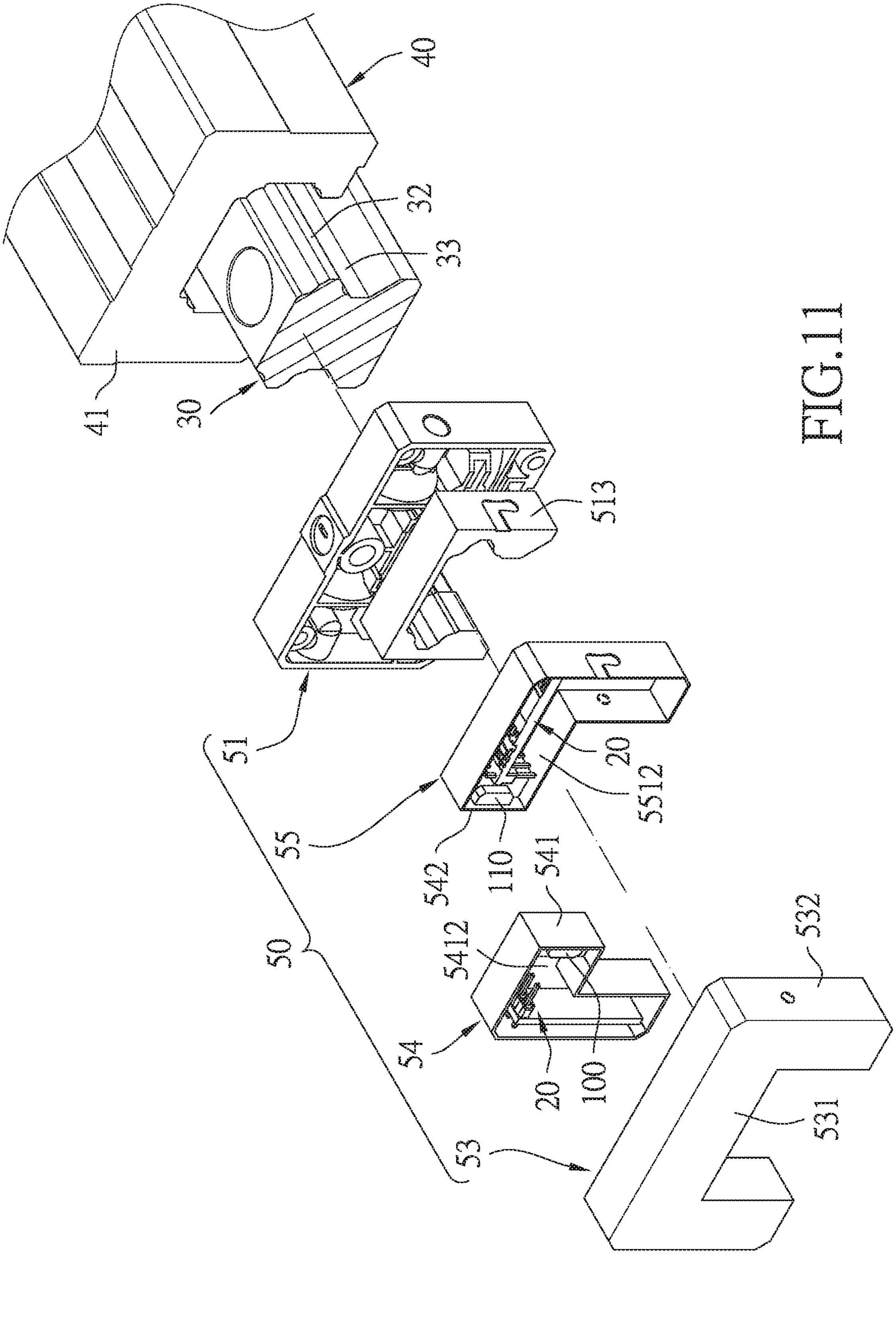
FIG. 11 is an exploded perspective view of a fifth embodiment of the present invention, showing that the linear transmission device is a linear guideway, and the first accommodating member and the second accommodating member are magnetically connected.

In addition, the above embodiments are described by using a ball screw as examples, and referring to FIG. 10, the linear transmission device of this embodiment may also be applied to a linear guideway, so that the elongated shaft member 30 is a rail, the movable member 40 is a slide block, and the base member 51 is disposed on an end cover 70 of the linear guideway. In this embodiment, the housing unit 50 has two accommodating members 54 and 55, wherein the accommodating member 54 has a third joint end portion 541, and the other accommodating member 55 has a fourth joint end portion 551 capable of being concave-convexly engaged with the third engaging end portion 541. In addition, the third joint end portion 541 is provided with a plurality of third electrode points 5411, and the fourth joint end portion 551 is provided with a plurality of fourth electrode points 5511 that can be electrically connected to the plurality of third electrode points 5411, respectively. This embodiment is not served as a limitation. Please refer to FIG. 11, in other embodiments, a third magnetic member 100 is fixed in an accommodating groove 5412 of the third joint end portion 541, and a fourth magnetic member 110 is fixed in the accommodating groove 5512 of the fourth joint end portion 551. Through the arrangement of the third and fourth magnetic members 100, 110, the third joint end portion 541 is magnetically connected with the fourth joint end portion 551, and its functions and applications are the same as those of the ball screw described above.

The above is the configuration description of the main components of the embodiments of the present invention. As for the effect of the present invention, it is explained as follows.

In this way, the present invention provides a linear transmission device, the main feature of which is that the accommodating members 52 of the housing unit 50 adopts a modular design, which can be changed in shapes, arranged and combined into different styles, so that the electronic components 20 installed in the housing unit 50 can be adjusted according to the customer's needs, which is beneficial to replace or add the electronic components 20, so that the customer can use the linear transmission device of the present invention more flexibly.

While we have shown and described various embodiments in accordance with the present invention, it is clear to those skilled in the art that further embodiments may be made without departing from the scope of the present invention.

What is claimed is:

1. A linear transmission device suitable for mounting of at least one electronic component, comprising:

an elongated shaft member extending along an axial direction;

a movable member sleeved onto the elongated shaft member in a reciprocating displacement along the axial direction, and having an end surface at one end thereof;

a housing unit including: a base member and at least one accommodating member, wherein the base member is disposed on the end surface of the movable member and sleeved onto the elongated shaft member, and includes: an assembling surface on a radial outer side of the base member, and a plurality of assembling portions disposed on the assembling surface, the at least one accommodating member is disposed on the base member and includes: a first engaging surface facing the assembling surface, a second engaging surface opposite to the first engaging surface, and an accommodating groove located between the first engaging surface and the second engaging surface for accommodating the electronic component, and the first engaging surface is provided with a plurality of connecting portions which are combined with the assembling portions.

2. The linear transmission device as claimed in claim 1, wherein a plurality of engaging grooves are formed in the second engaging surface, the housing unit further includes a housing member sleeved on the at least one accommodating member, and the housing member includes a covering surface for covering the base member and the at least one accommodating member, and a plurality of engaging protrusions formed on the covering surface for engaging with the plurality of engaging grooves.

3. The linear transmission device as claimed in claim 1, wherein the linear transmission device is a ball screw, and one said accommodating member has a center of curvature which is connected to two ends of the accommodating member to form an angle which is greater than 180 degrees.

4. The linear transmission device as claimed in claim 1, wherein the linear transmission device is a ball screw, the movable member has a first hole penetrating the end surface, the accommodating member is provided with a second hole penetrating through thereof and corresponding to the first hole, an area of the second hole is larger than that of the first hole, and the first hole communicates with the second hole.

5. The linear transmission device as claimed in claim 1, wherein the linear transmission device is a ball screw, there are two or more said accommodating members, each of the accommodating members has a first joint end portion and a second joint end opposite to the first joint end portion, and the first joint end portion and the second joint end portion of each of the accommodating members are concave-convexly engaged with or magnetically connected to the first joint end portion and the second joint end portion of an adjacent accommodating member, respectively.

6. The linear transmission device as claimed in claim 5, wherein the first joint end portion is provided with a plurality of first electrode points, the second joint end portion is provided with a plurality of second electrode points, and the first joint end portion and the second joint end portion of each of the accommodating members are electrically connected to the first joint end portion and the second joint end portion of the adjacent accommodating member, respectively.

7. The linear transmission device as claimed in claim 1, wherein the linear transmission device is a ball screw, the base member is a wiper and has an inner thread groove corresponding to an outer thread groove of the elongated shaft member.

8. The linear transmission device as claimed in claim 1, wherein the linear transmission device is a linear guideway, the housing unit is provided with two said accommodating members, one of the accommodating members has a third joint end portion, and another of the accommodating members has a fourth joint end portion capable of being concave-convexly engaged with or magnetically connected to the third engaging end portion.

9. The linear transmission device as claimed in claim 8, wherein the third joint end portion is provided with a plurality of third electrode points, and the fourth joint end portion is provided with a plurality of fourth electrode points capable of being electrically connected to the plurality of third electrode points, respectively.

10. The linear transmission device as claimed in claim 1, wherein another said housing unit is disposed at another end surface of the movable member.

* * * * *